(12) United States Patent
Hu et al.

(10) Patent No.: US 10,145,683 B2
(45) Date of Patent: Dec. 4, 2018

(54) METHOD AND DEVICE FOR MEASURING DIP ANGLE OF OPPOSITELY CROSSLY PLACED PAIRED QUARTERED RING-QUARTERED CIRCLE NESTED POLAR PLATES

(71) Applicant: HARBIN INSTITUTE OF TECHNOLOGY, Heilongjiang (CN)

(72) Inventors: Pengcheng Hu, Heilongjiang (CN); Jiubin Tan, Heilongjiang (CN); Jiahao Guo, Heilongjiang (CN)

(73) Assignee: Harbin Institute of Technology (CN)

( * ) Notice: Subject to any disclaimer, the term of this patent is extended or adjusted under 35 U.S.C. 154(b) by 106 days.

(21) Appl. No.: 15/307,300

(22) PCT Filed: Mar. 31, 2015

(86) PCT No.: PCT/CN2015/075460
§ 371 (c)(1),
(2) Date: Oct. 27, 2016

(87) PCT Pub. No.: WO2015/165316
PCT Pub. Date: Nov. 5, 2015

(65) Prior Publication Data
US 2017/0052025 A1 Feb. 23, 2017

(30) Foreign Application Priority Data

Apr. 28, 2014 (CN) .......................... 2014 1 0179173
Apr. 28, 2014 (CN) .......................... 2014 1 0179253
Apr. 28, 2014 (CN) .......................... 2014 1 0179299

(51) Int. Cl.
*G01C 9/18* (2006.01)
*G01C 9/20* (2006.01)
(Continued)

(52) U.S. Cl.
CPC ................. *G01C 9/20* (2013.01); *G01C 9/00* (2013.01); *G01C 9/06* (2013.01); *G01C 9/18* (2013.01);
(Continued)

(58) Field of Classification Search
None
See application file for complete search history.

(56) References Cited

U.S. PATENT DOCUMENTS 2,711,590 A * 6/1955 Wilcox .................... G01C 9/18
200/56 R
3,698,094 A * 10/1972 Stacey .................... G01C 9/18
33/366.13
(Continued)

FOREIGN PATENT DOCUMENTS

CN        104019797 A        9/2014
CN        104034256 A        9/2014
(Continued)

OTHER PUBLICATIONS

International Search Report and Written Opinion in International Application No. PCT/CN2015/075460 dated Jul. 17, 2015.
(Continued)

*Primary Examiner* — Patrick Assouad
*Assistant Examiner* — Demetrius Pretlow
(74) *Attorney, Agent, or Firm* — Nixon Peabody LLP

(57) ABSTRACT

A method for measuring a dip angle of oppositely crossly placed paired quartered ring-quartered circle nested polar plates. An annular coplanar capacitance measuring head of a sensor unit consists of four quarter round metal plates and four quarter circular-ring-shaped metal plates, the eight metal plates are coplanar and concentric with one another, and a quarter round metal plate and a quarter circular-ring-shaped metal plate corresponding to the same sector angle
(Continued)

form a capacitor. Two annular coplanar capacitance measuring heads are arranged on two round insulating substrates, the two round insulating substrates are used as two bottom surfaces of a cylindrical container, the cylindrical container is transversely arranged, and an insulating liquid equal to ½ volume of the cylindrical container is injected into the cylindrical container in a sealing manner. Potential leads extract potentials of the sixteen metal plates and are connected to an input end of a capacitance measuring unit, and the capacitance measuring unit is connected to a dip measuring unit. When the cylindrical container tilts, the relative positions of the two annular coplanar capacitance measuring heads and the insulating liquid are changed, and a dip angle value can be calculated by measuring the change of a capacitance value. Also disclosed is a device for measuring a dip angle of oppositely crossly placed paired quartered ring-quartered circle nested polar plates.

4 Claims, 4 Drawing Sheets

(51) Int. Cl.
    *G01C 9/00*     (2006.01)
    *G01C 9/06*     (2006.01)
(52) U.S. Cl.
    CPC . *G01C 2009/062* (2013.01); *G01C 2009/185* (2013.01)

(56) References Cited

U.S. PATENT DOCUMENTS

| | | | | |
|---|---|---|---|---|
| 3,906,471 | A | * | 9/1975 | Shawhan ............... E21B 47/022 324/660 |
| 5,180,986 | A | * | 1/1993 | Swartz ..................... G01C 9/06 324/660 |
| 6,516,527 | B1 | * | 2/2003 | Moriyasu ................. G01C 9/06 33/366.11 |
| 7,302,762 | B1 | | 4/2007 | Ahn et al. |
| 2004/0205973 | A1 | * | 10/2004 | Barr ....................... A63B 57/00 33/366.19 |
| 2014/0082954 | A1 | * | 3/2014 | Chen ....................... G01C 9/20 33/366.19 |

FOREIGN PATENT DOCUMENTS

| | | | |
|---|---|---|---|
| CN | 104034308 A | 9/2014 | |
| CN | 104034312 A | 9/2014 | |
| CN | 104034313 A | 9/2014 | |
| EP | 0546822 A2 * | 6/1993 | ............... G01C 9/06 |

OTHER PUBLICATIONS

International Preliminary Report on Patentability in International Application No. PCT/CN2015/075460 dated Aug. 24, 2016.

* cited by examiner

METHOD AND DEVICE FOR MEASURING DIP ANGLE OF OPPOSITELY CROSSLY PLACED PAIRED QUARTERED RING-QUARTERED CIRCLE NESTED POLAR PLATES

TECHNICAL FIELD

The present invention belongs to the technical field of angle measurement and mainly relates to a method and device for measuring a dip angle.

BACKGROUND

At present, the known sensing method for measuring a dip angle adopts the principle that a liquid surface remains horizontal all the time in the stationary state. When a container in which a liquid is added tilts, the liquid surface remains horizontal after stabilization, however the relative position between the liquid and the container changes. The angle of the container with respect to the surface of the inside liquid is calculated by detecting the change of the electrical quantity caused by this process, thereby the dip angle of the container is further measured.

As to the sensing manner for measuring the dip angle between the container and the surface of the liquid added therein, it can be divided into two main categories: resistance type and electrostatic capacitance type.

The Japanese patent publication No. 2001-13160 introduced the relevant technology of resistance type sensor, wherein a proper amount of conductive liquid was injected, in a sealing manner, into the cylindrical metallic container of which one end was closed and the opening was blocked by a round metal plate. A pair of metal electrodes are passed through and fixed to the round plates. When the container tilted, the angle formed by the container and the surface of inside liquid changes, such that the contact areas of the metal electrodes and the conductive liquid change, thereby the resistances between the metal container and the individual metal electrode change. By measuring changes of the resistance values, the dip angle of the container could be detected.

However, direct contact of the metal electrode with the conductive liquid causes electrochemical reactions such as metal precipitation of electrode itself, electrolysis of the conductive liquid, etc. Thus it is hard to ensure a long-term accuracy and stability of the sensor.

Regarding the electrostatic capacitance-type sensor, Chinese Patent No. CN 1668892A introduced the relevant technology. In this sensor, conductive liquid equal to ½ volume of the cylindrical closed container that is made of electrical insulator was injected into the container in a sealing manner. Plate-shaped main electrodes were placed on two sides in parallel to each other inside the container, and the surfaces of electrodes were covered with the silicon oxide films serving as dielectrics. When the container is tilted, an angle formed by the container and the surface of the liquid in the container changes such that the capacitance between the plate-shaped main electrodes and the conductive liquid changes. Accordingly, changes of the capacitance values were measured such that a dip angle of the container was detected.

However, in this case of the electrostatic capacitance-type sensor, when the dip angle of the cylindrical closed container is too large, the liquid in the container is biased to one side to lose contact with the other main electrode. At this moment, the sensor does not work. Due to limitations of the principle, the range of the measurable dip angle is often limited and depends on internal structural size of the container.

SUMMARY

The present invention aims at the above problems such as direct contact of the metal electrode and conductive liquid, difficulty in ensuring long-term stability of the sensor, and limitation in the range of the measurable dip angle in the prior sensing method for detecting a dip angle, etc. The present invention proposes and designs a method and device for measuring dip angle by way of oppositely crossly placed paired quartered ring-quartered circle nested polar plates. In this invention, an insulating liquid is used to avoid electrochemical reactions such as precipitation from polar plate. An annular coplanar capacitance structure in a sensor unit achieves 360 full-range measurement.

The objective of this invention is achieved by the following technical solutions:

A method for measuring dip angle by way of oppositely crossly placed paired quartered ring-quartered circle nested polar plates, the method are of the following steps:

(1) One round metal plate and one outer circular-ring-shaped metal plate are placed to keep coplanar and concentric with one another, and the round metal plate and the outer circular-ring-shaped metal plate are quartered in the radial direction respectively to obtain four quarter round metal plates and four quarter circular-ring-shaped metal plates, and a quarter round metal plate and a quarter circular-ring-shaped metal plate corresponding to the same sector angle form a capacitor. A combination of the four quarter round metal plates and four quarter circular-ring-shaped metal plates is used to obtain the annular coplanar capacitance measuring head;

(2) The two annular coplanar capacitance measuring heads as described above are vertically immerged into the insulating liquid, with the two annular coplanar capacitance measuring heads being placed coaxially and oppositely and a quarter round metal plate and a quarter circular-ring-shaped metal plate of the two annular coplanar capacitance measuring heads being both crossly distributed. The liquid surface of the insulating liquid passes the center of the two annular coplanar capacitance measuring heads. The capacitance value formed by a quarter round metal plate and a quarter circular-ring-shaped metal plate corresponding to the same sector angle is codetermined by the dielectric constant of air, the dielectric constant of the insulating liquid, the corresponding sector angle of the portion of respective polar plate that is exposed to the air and the corresponding sector angle of the portion of respective polar plate that is immerged in the insulating liquid;

(3) When the above two annular coplanar capacitance measuring heads rotate circumferentially around the center, the dip angle changes and the liquid surface of the insulating liquid maintains horizontal, so that the relative positions of the two annular coplanar capacitance measuring heads and the insulating liquid change and the corresponding section angle of the portion of respective polar plate that is exposed to the air and the corresponding sector angle of the portion of respective polar plate that is immerged in the insulating liquid change, thereby a dip angle value can be calculated by measuring changes of the capacitance values formed by a quarter round metal plate and a quarter circular-ring-shaped metal plate corresponding to the same sector angle;

(4) When the two annular coplanar capacitance measuring heads rotate circumferentially around the center and the surface of the insulating liquid is near to the radial dividing line of any one of annular coplanar capacitance measuring heads, the calculated result obtained by another annular coplanar capacitance measuring head is taken as the final calculated result of the dip angle.

A device for measuring dip angle by way of oppositely crossly placed paired quartered ring-quartered circle nested polar plates comprises a capacitance measuring unit and a dip angle calculating unit with the two units being connected to each other; the device further comprises a sensor unit that is configured as: two round insulating substrates are mounted in a seal manner on the two opening ends of the cylindrical container with two opening-shaped ends, and two annular coplanar capacitance measuring heads are mounted respectively on the inner sides of the two round insulating substrates in the chamber of cylindrical container; one of the two annular coplanar capacitance measuring heads consists of four quarter round metal plates and four quarter circular-ring-shaped metal plates, wherein the four quarter circular-ring-shaped metal plates are configured on the outer sides of the four quarter round metal plates, and the four quarter circular-ring-shaped metal plates are coplanar and concentric with the four quarter round metal plates, and four quarter circular-ring-shaped metal plates are evenly and circumferentially distributed and correspond to the four quarter round metal plates respectively; other one of the two annular coplanar capacitance measuring heads consists of four quarter round metal plates, and four quarter circular-ring-shaped metal plates, wherein the four quarter circular-ring-shaped metal plates are configured on the outer side of the four quarter round metal plates, and the four quarter circular-ring-shaped metal plates are coplanar and concentric with the four quarter round metal plates, and four quarter circular-ring-shaped metal plates are evenly and circumferentially distributed and correspond to the four quarter round metal plates, respectively; the four quarter round metal plates of the one of the two annular coplanar capacitance measuring heads and the four quarter round metal plates of the other one of the two annular coplanar capacitance measuring heads are crossly distributed, and the four quarter circular-ring-shaped metal plates of the one of the two annular coplanar capacitance measuring heads and the four circular-ring-shaped metal plates of the other one of the two annular coplanar capacitance measuring heads are crossly distributed; sixteen potential leads connect the four quarter round metal plates, the four quarter circular-ring-shaped metal plates, the four quarter round metal plates, and the four quarter circular-ring-shaped metal plates to an input end of a capacitance measuring unit, sequentially and respectively; the cylindrical container is transversely arranged, and an insulating liquid equal to ½ volume of the cylindrical container is injected into the cylindrical container in a sealing manner.

This invention has the following features and advantageous effects:

(1) Compared with the resistance-type dip angle measuring device, since it is the insulating liquid that makes contact with the electrode polar plate, the electrochemical reactions such as metal precipitation of electrode itself are avoided, and thus the long term stability and reliability of the sensor can be maintained.

(2) Compared with the electrostatic capacitance-type dip angle measuring device, since the transversely arranged container can rotate throughout 360° around the central axis, a functional relationship exists all the time between the output capacitance value and the dip angle. Therefore, the measured range is not limited and it possesses the feature of 360° full range measurement.

(3) Since both the round metal plates and the outer circular-ring-shaped metal plates are radially divided into four quarters, the obtained four quarter round metal plates and the four quarter circular-ring-shaped metal plates correspond to each other respectively, so that the power lines adjacent to the radial dividing lines of the annular coplanar capacitance measuring heads are distributed more evenly, which eliminates the micro-error generated by radial division in principle and makes the measured result more precise.

(4) Since two coaxially oppositely placed annular coplanar capacitance measuring heads are used and the quarter round metal plates and the quarter circular-ring-shaped metal plates of the two annular coplanar capacitance measuring heads are both crossly distributed, this improves the sensitivity for measuring the dip angle when the insulating liquid surface is adjacent to the radial dividing line of the annular coplanar capacitance measuring head and makes the measured result more precise.

Figure 1:
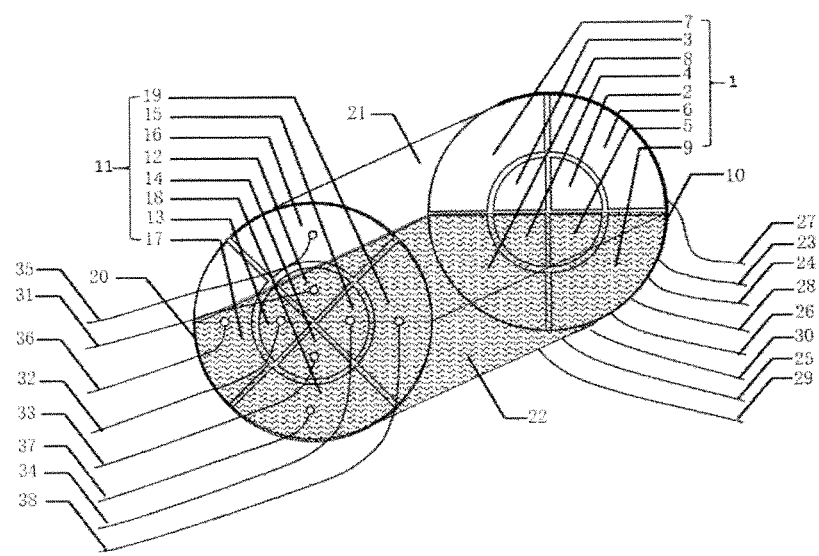
FIG. 1 is the outline perspective view of sensor unit of the device for measuring dip angle by way of oppositely crossly placed paired quartered ring-quartered circle nested polar plates.

Reference numerals in the drawing are explained as follows: 1. annular coplanar capacitance measuring head, 2. quarter round metal plate, 3. quarter round metal plate, 4. quarter round metal plate, 5. quarter round metal plate, 6. quarter circular-ring-shaped metal plate, 7. quarter circular-ring-shaped metal plate, 8. quarter circular-ring-shaped metal plate, 9. quarter circular-ring-shaped metal plate, 10. round insulating substrate, 11. annular coplanar capacitance measuring head, 12. quarter round metal plate, 13. quarter round metal plate, 14. quarter round metal plate, 15. quarter round metal plate, 16. quarter circular-ring-shaped metal plate, 17. quarter circular-ring-shaped metal plate, 18. quarter circular-ring-shaped metal plate, 19. quarter circular-ring-shaped metal plate, 20. round insulating substrate, 21. cylindrical container, 22. insulating liquid, 23. 24. 25. 26. 27. 28. 29. 30. 31. 32. 33. 34. 35. 36. 37. 38 potential leads, 39. sensor unit, 40. capacitance measuring unit, 41. dip angle calculating unit.

DETAILED DESCRIPTION OF THE EMBODIMENTS

The embodiments of this invention are described as follows in detail in combination with the drawings.

Figure 8:
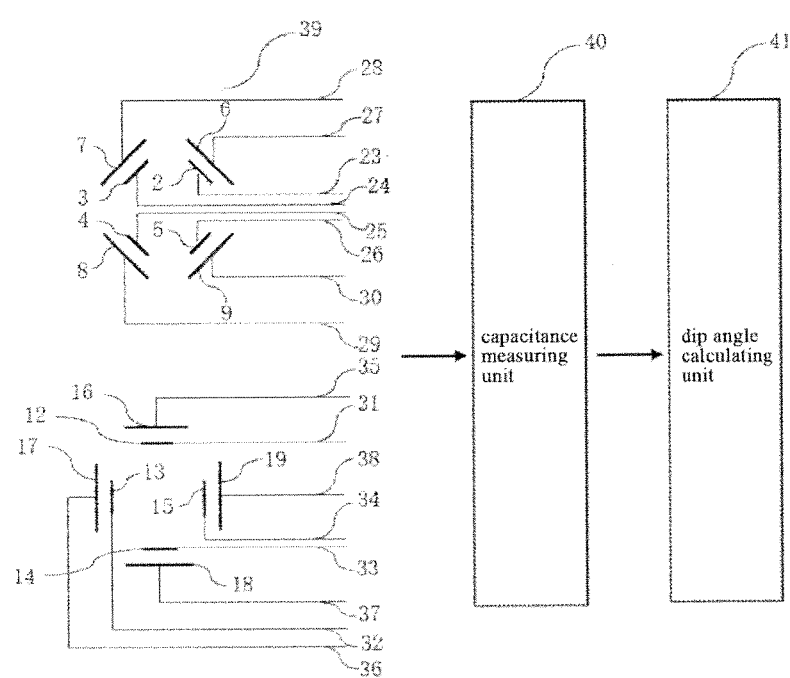
FIG. 8 is the schematic diagram of overall structure of the device for measuring dip angle by way of oppositely crossly placed paired quartered ring-quartered circle nested polar plates.

A device for measuring dip angle by way of oppositely crossly placed paired quartered ring-quartered circle nested polar plates comprises a sensor unit 39, a capacitance measuring unit 40 and a dip angle calculating unit 41, with the schematic diagram of overall structure of device for measuring dip angle as shown in FIG. 8.

FIG. 1 is the outline perspective view of sensor unit of the device for measuring dip angle. The sensor unit 27 is configured as follows: two round insulating substrates 10, 20 are mounted in a sealing manner respectively on the two opening ends of the cylindrical container 21 with two opening-shaped ends, and two annular coplanar capacitance measuring heads 1, 11 are respectively mounted on the inner sides of the two round insulating substrates 10, 20 in the chamber of cylindrical container 21; the annular coplanar capacitance measuring head 1 consists of four quarter round metal plates 2, 3, 4, 5 and four quarter circular-ring-shaped metal plates 6, 7, 8, 9, wherein the four quarter circular-ring-shaped metal plates 6, 7, 8, 9 are configured on the outer sides of the four quarter round metal plates 2, 3, 4, 5, and the four quarter circular-ring-shaped metal plates 6, 7, 8, 9 are coplanar and concentric with the four quarter round metal plates 2, 3, 4, 5, and four quarter circular-ring-shaped metal plates 6, 7, 8, 9 are evenly and circumferentially distributed and correspond to the four quarter round metal plates 2, 3, 4, 5 respectively; the annular coplanar capacitance measuring head 11 consists of four quarter round metal plates 12, 13, 14, 15 and four quarter circular-ring-shaped metal plates 16, 17, 18, 19, wherein the four quarter circular-ring-shaped metal plates 16, 17, 18, 19 are configured on the outer sides of the four quarter round metal plates 12, 13, 14, 15, and the four quarter circular-ring-shaped metal plates 16, 17, 18, 19 are coplanar and concentric with the four quarter round metal plates 12, 13, 14, 15, and four quarter circular-ring-shaped metal plates 16, 17, 18, 19 are evenly and circumferentially distributed and correspond to the four quarter round metal plates 12, 13, 14, 15 respectively; the four quarter round metal plates 2, 3, 4, 5 of the annular coplanar capacitance measuring head 1 and the four quarter round metal plates 12, 13, 14, 15 of the annular coplanar capacitance measuring head 11 are crossly distributed, and the four quarter circular-ring-shaped metal plates 6, 7, 8, 9 of the annular coplanar capacitance measuring head 1 and the four quarter circular-ring-shaped metal plates 16, 17, 18, 19 of the annular coplanar capacitance measuring head 11 are crossly distributed; sixteen potential leads 23, 24, 25, 26, 27, 28, 29, 30, 31, 32, 33, 34, 35, 36, 37, 38 connect the four quarter round metal plates 2, 3, 4, 5, the four quarter circular-ring-shaped metal plates 6, 7, 8, 9, the four quarter round metal plates 12, 13, 14, 15 and the four quarter circular-ring-shaped metal plates 16, 17, 18, 19 to an input end of the capacitance measuring unit 39, subsequently and respectively; the cylindrical container 21 is transversely arranged, and insulating liquid 22 equal to ½ volume of the cylindrical container 21 is injected into the cylindrical container 21 in a sealing manner.

The round insulating substrates 10, 20 are made of a resin glass fiber material.

The insulating liquid 22 is a liquid of combing one or more components of alcohols such as methanol, ethanol, isopropanol, ketones such as acetone, butanone, and ethers such as diethylene glycol monobutylether.

A method for measuring dip angle by way of oppositely crossly placed paired quartered ring-quartered circle nested polar plates comprises the following steps:

(1) One round metal plate and one outer circular-ring-shaped metal plate are placed to keep coplanar and concentric with one another, and four quarter circular-ring-shaped metal plates are obtained by dividing the outer circular-ring-shaped metal plate into four quarters in the radial direction. Each quarter circular-ring-shaped metal plate forms a capacitor with the round metal plate respectively, and said one round metal plate is combined with the four quarter circular-ring-shaped metal plates to obtain the annular coplanar capacitance measuring head.

Figure 2:
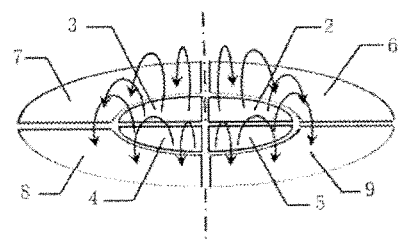
FIG. 2 is the schematic diagram of the annular coplanar capacitance measuring head 1 of sensor unit of the device for measuring dip angle by way of oppositely crossly placed paired quartered ring-quartered circle nested polar plates.
Figure 3:
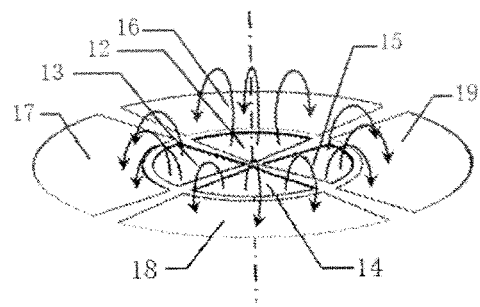
FIG. 3 is the schematic diagram of the annular coplanar capacitance measuring head 11 of sensor unit of the device for measuring dip angle by way of oppositely crossly placed paired quartered ring-quartered circle nested polar plates.

With reference to FIGS. 2 and 3, the power lines between the metal plates of the annular coplanar capacitance measuring heads 1 and 11 are distributed evenly along the metal plate, and can be approximately replaced with semicircle arc lines. In accordance with the formula of computing a single coplanar capacitance, it can be known that the annular coplanar capacitance is directly proportional to the dielectric constant of the dielectrics. It can be expressed as follows.

$$C = K \cdot \varepsilon$$

(2) The above two annular coplanar capacitance measuring heads are vertically immersed into the insulating liquid, with two annular coplanar capacitance measuring heads being placed coaxially oppositely and the quarter circular-ring-shaped metal plates of the two annular coplanar capacitance measuring heads being crossly distributed. The liquid surface of the insulating fluid passes through the center of the two annular coplanar capacitance measuring heads and the capacitance value of the capacitor formed by each quarter circular-ring-shaped metal plate and the round metal plate is codetermined by the dielectric constant of air, the dielectric constant of the insulating liquid, the corresponding sector angle of the portion of the respective polar plate that is exposed to the air, and the corresponding sector angle of the portion of the respective polar plate that is immersed in the insulating liquid.

Figure 4:
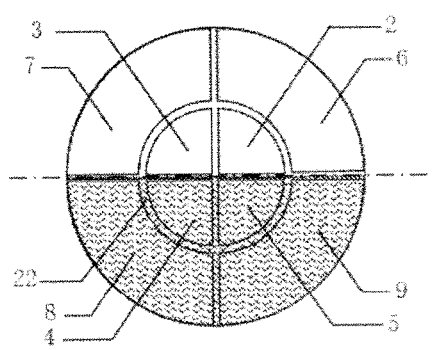
FIG. 4 is the front view of the annular coplanar capacitance measuring head 1 of sensor unit of the device for measuring dip angle by way of oppositely crossly placed paired quartered ring-quartered circle nested polar plates.

FIG. 4 is the front view of the annular coplanar capacitance measuring head 1 of sensor unit of the device for measuring dip angle. The capacitance formed by metal plates 2 and 6, the capacitance formed by metal plates 3 and 7, the capacitance formed by metal plates 4, 8 and the capacitance formed by metal plates 5 and 9 are represented respectively by the following formulas.

$$C_{26} = K \cdot \frac{90°}{360°} \cdot \varepsilon_{air}$$

$$C_{37} = K \cdot \frac{90°}{360°} \cdot \varepsilon_{air}$$

$$C_{48} = K \cdot \frac{90°}{360°} \cdot \varepsilon_{liquid}$$

$$C_{59} = K \cdot \frac{90°}{360°} \cdot \varepsilon_{liquid}$$

Figure 5:
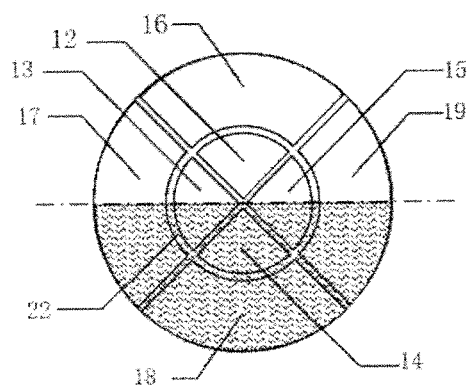
FIG. 5 is the front view of the annular coplanar capacitance measuring head 11 of sensor unit of the device for measuring dip angle by way of oppositely crossly placed paired quartered ring-quartered circle nested polar plates.

FIG. 5 is the front view of the annular coplanar capacitance measuring head 11 of sensor unit of the device for measuring dip angle. The capacitance formed by metal plates 12 and 16, the capacitance formed by metal plates 13 and 17, the capacitance formed by metal plates 14 and 18 and the capacitance formed by metal plates 15 and 19 can be represented respectively by the following formulas.

$$C_{1216} = K \cdot \frac{90°}{360°} \cdot \varepsilon_{air}$$

$$C_{1317} = K \cdot \frac{45°}{360°} \cdot \varepsilon_{air} + K \cdot \frac{45°}{360°} \cdot \varepsilon_{liquid}$$

$$C_{1418} = K \cdot \frac{90°}{360°} \cdot \varepsilon_{liquid}$$

$$C_{1519} = K \cdot \frac{45°}{360°} \cdot \varepsilon_{air} + K \cdot \frac{45°}{360°} \cdot \varepsilon_{liquid}$$

(3) When the above two annular coplanar capacitance measuring heads rotate circumferentially around the centre, the dip angle changes and the liquid surface of the insulating liquid remains horizontal, and the relative positions of the two annular coplanar capacitance measuring heads and the insulating liquid change, and the corresponding sector angle of the portion of each polar plate that is exposed to the air and the corresponding sector angle of the portion of each polar plate that is immerged in the insulating liquid changes.

Figure 6:
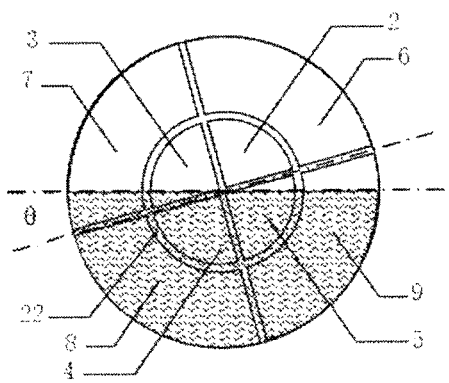
FIG. 6 is a view illustrating the annular coplanar capacitance measuring head 1 of sensor unit of the device for measuring dip angle by way of oppositely crossly placed paired quartered ring-quartered circle nested polar plates when it tilts.

FIG. 6 shows a view illustrating the annular coplanar capacitance measuring head 1 when tilting. At this time the capacitance formed by metal plates 2 and 6, the capacitance formed by metal plates 3 and 7, the capacitance formed by metal plates 4 and 8, and the capacitance formed by metal plates 5 and 9 are respectively shown as follows.

$$C_{26} = K \cdot \frac{90°}{360°} \cdot \varepsilon_{air}$$

$$C_{37} = K \cdot \frac{90° - \theta}{360°} \cdot \varepsilon_{air} + K \cdot \frac{\theta}{360°} \cdot \varepsilon_{liquid}$$

$$C_{48} = K \cdot \frac{90°}{360°} \cdot \varepsilon_{liquid}$$

$$C_{59} = K \cdot \frac{90° - \theta}{360°} \cdot \varepsilon_{liquid} + K \cdot \frac{\theta}{360°} \cdot \varepsilon_{air}$$

Combining the above formulas by applying subtraction, it can be obtained:

$$C_{48} - C_{26} = K \cdot \frac{90°}{360°} (\varepsilon_{liquid} - \varepsilon_{air})$$

$$C_{59} - C_{37} = K \cdot \frac{90° - 2\theta}{360°} (\varepsilon_{liquid} - \varepsilon_{air})$$

Thereby, the dip angle is solved by using the calculating formula as:

$$\theta = 45° \left(1 - \frac{C_{59} - C_{37}}{C_{48} - C_{26}}\right)$$

Figure 7:
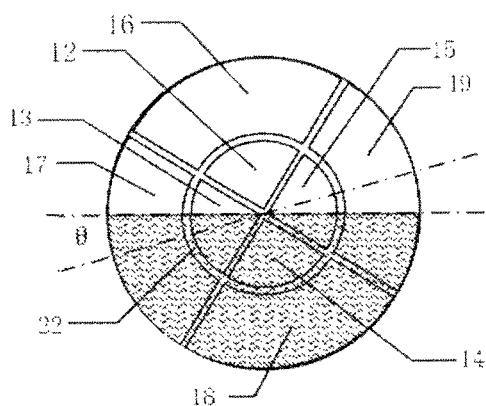
FIG. 7 is a view illustrating the annular coplanar capacitance measuring head 11 of sensor unit of the device for measuring dip angle by way of oppositely crossly placed paired quartered ring-quartered circle nested polar plates when it tilts.

FIG. 7 shows a view illustrating the annular coplanar capacitance measuring head 11 tilting. At this time the capacitance formed by metal plates 12 and 16, the capacitance formed by metal plates 13 and 17, the capacitance formed by metal plates 14 and 18 and the capacitance formed by metal plates 15 and 19 are respectively shown below.

$$C_{1216} = K \cdot \frac{90°}{360°} \varepsilon_{air}$$

$$C_{1317} = K \cdot \frac{45° - \theta}{360°} \cdot \varepsilon_{air} + K \cdot \frac{45° + \theta}{360°} \cdot \varepsilon_{liquid}$$

$$C_{1418} = K \cdot \frac{90°}{360°} \varepsilon_{liquid}$$

$$C_{1519} = K \cdot \frac{45° + \theta}{360°} \cdot \varepsilon_{air} + K \cdot \frac{45° - \theta}{360°} \cdot \varepsilon_{liquid}$$

Combining the above formulas by applying subtraction, it can be obtained:

$$C_{1418} - C_{1216} = K \cdot \frac{90°}{360°} (\varepsilon_{liquid} - \varepsilon_{air})$$

$$C_{1519} - C_{1317} = K \cdot \frac{-2\theta}{360°} (\varepsilon_{liquid} - \varepsilon_{air})$$

Thereby, the dip angle is solved by using the calculating formula as:

$$\theta = -45° \frac{C_{1519} - C_{1317}}{C_{1418} - C_{1216}}$$

The dip angle output can be obtained by comparison processing of the obtained signals via the capacitance measuring unit and dip angle calculating unit.

(4) The above two annular coplanar capacitance measuring heads rotate circumferentially around the centre, and when the liquid surface of the insulating liquid is adjacent to the radial dividing line of any one of the annular coplanar capacitance measuring heads, the calculated result obtained by another annular coplanar capacitance measuring head is taken as the final calculated result of the dip angle.

When the dip angle is about ±45 and ±135, the liquid surface of the insulating liquid is adjacent to the radial dividing line of the annular coplanar capacitance measuring head 11. At this moment, the annular coplanar capacitance measuring head 1 is taken as the input of the capacitance measuring unit, which can improve the sensitivity of the device for measuring a dip angle to make the measured result more accurate. Similarly, when the dip angle is about ±0° and ±90°, the liquid surface of the insulating liquid is adjacent to the radial dividing line of the annular coplanar capacitance measuring head 1. At this moment, the annular coplanar capacitance measuring head 11 is taken as the input of the capacitance measuring unit, and the same effect can be achieved.

The invention claimed is:

1. A method for measuring dip angle by way of oppositely crossly placed paired quartered ring-quartered circle nested polar plates, wherein the method comprises the following steps:

(1) one round metal plate and one outer circular-ring-shaped metal plate are placed coplanar and concentric with one another, and the round metal plate and the outer circular-ring-shaped metal plate are quartered in the radial direction respectively to obtain four quarter round metal plates and four quarter circular-ring-shaped metal plates, and a quarter round metal plate and a quarter circular-ring-shaped metal plate corresponding to the same sector angle forms a capacitor, an annular coplanar capacitance measuring head is obtained by combining the four quarter round metal plates and four quarter circular-ring-shaped metal plates;

(2) the two annular coplanar capacitance measuring heads as described above are vertically immerged into the insulating liquid, with the two annular coplanar capacitance measuring heads being placed coaxially and oppositely and a quarter round metal plate and a quarter circular-ring-shaped metal plate of the two annular coplanar capacitance measuring heads being both crossly distributed, and the liquid surface of the insulating liquid passes through the center of the two annular coplanar capacitance measuring heads, and the capacitance value of the capacitor formed by a quarter round metal plate and a quarter circular-ring-shaped metal plate corresponding to the same sector angle is codetermined by the dielectric constant of air, the dielectric constant of the insulating liquid, a corresponding sector angle of a portion of respective polar plate that is exposed to the air, and a corresponding sector angle of a portion of the respective polar plate that is immerged in the insulating liquid;

(3) when the above two annular coplanar capacitance measuring heads rotate circumferentially around the center, its dip angle changes and the liquid surface of the insulating liquid maintains horizontal, and the relative positions of the two annular coplanar capacitance measuring heads and the insulating liquid change, and a corresponding section angle of a portion of the respective polar plate that is exposed to the air and a corresponding sector angle of a portion of the respective polar plate that is immerged in the insulating liquid change, and a dip angle value is calculated by measuring changes of the capacitance values of the capacitor formed by a quarter round metal plate and a quarter circular-ring-shaped metal plate corresponding to the same sector angle;

(4) the two annular coplanar capacitance measuring heads rotate circumferentially around the center, and when the liquid surface of the insulating liquid is near to the radial dividing line of any one of the annular coplanar capacitance measuring heads, the calculated result obtained by another annular coplanar capacitance measuring head is taken as the final calculated value of the dip angle.

2. A device for measuring dip angle by way of oppositely crossly placed paired quartered ring-quartered circle nested polar plates, comprising a capacitance measuring unit and a dip angle calculating unit that are connected to each other, wherein the device further comprising a sensor unit, wherein the sensor unit is configured as follows: two round insulating substrates are mounted in a sealing manner respectively on the two opening ends of a cylindrical container with two opening-shaped ends, and two annular coplanar capacitance measuring heads are mounted respectively on the inner sides of the two round insulating substrates in the chamber of the cylindrical container; wherein the annular coplanar capacitance measuring head consists of four quarter round metal plates and four quarter circular-ring-shaped metal plates, wherein the four quarter circular-ring-shaped metal plates are configured on the outer sides of the four quarter round metal plates, and the four quarter circular-ring-shaped metal plates are coplanar and concentric with the four quarter round metal plates, and the four quarter circular-ring-shaped metal plates are evenly and circumferentially distributed and correspond to the four quarter round metal plates respectively; wherein the annular coplanar capacitance measuring head consists of four quarter round metal plates and four quarter circular-ring-shaped metal plates, wherein the four quarter circular-ring-shaped metal plates are configured on the outer sides of the four quarter round metal plates, the four quarter circular-ring-shaped metal plates are coplanar and concentric with the four quarter round metal plates, and the four quarter circular-ring-shaped metal plates are evenly and circumferentially distributed and correspond to the four quarter round metal plates respectively, wherein the four quarter round metal plates of the annular coplanar capacitance measuring head and the four quarter round metal plates of the annular coplanar capacitance measuring head are crossly distributed, and the four quarter circular-ring-shaped metal plates of the annular coplanar capacitance measuring head and the four quarter circular-ring-shaped metal plates, of the annular coplanar capacitance measuring head are crossly distributed, wherein the four quarter round metal plates, the four quarter circular-ring-shaped metal plates, the four quarter round metal plates, and the four quarter circular-ring-shaped metal plates are connected to an input end of the capacitance measuring unit via sixteen potential leads, subsequently and respectively; wherein the cylindrical container is transversely arranged, and an insulating liquid equal to ½ volume of the cylindrical container is injected into the cylindrical container in a sealing manner.

3. The device for measuring dip angle by way of oppositely crossly placed paired quartered ring-quartered circle nested polar plates according to claim 2, wherein the round insulating substrates are made of a resin glass fiber material.

4. The device for measuring dip angle by way of oppositely crossly placed paired quartered ring-quartered circle nested polar plates according to claim 2, wherein the insulating liquid is a liquid of combing one or more components of alcohols including methanol, ethanol, isopropanol, ketones including acetone, butanone, and ethers including diethylene glycol monobutylether.

\* \* \* \* \*